(12) United States Patent
Ichihara

(10) Patent No.: US 8,483,901 B2
(45) Date of Patent: Jul. 9, 2013

(54) POWER CHARGING STATION ADMINISTRATION DEVICE

(75) Inventor: Masaaki Ichihara, Anpachi-cho (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/577,749

(22) PCT Filed: Mar. 15, 2011

(86) PCT No.: PCT/JP2011/056064
§ 371 (c)(1),
(2), (4) Date: Aug. 8, 2012

(87) PCT Pub. No.: WO2011/115113
PCT Pub. Date: Sep. 22, 2011

(65) Prior Publication Data
US 2012/0303257 A1    Nov. 29, 2012

(30) Foreign Application Priority Data

Mar. 15, 2010   (JP) .............................. 2010-057679

(51) Int. Cl.
*G01M 17/00*    (2006.01)

(52) U.S. Cl.
USPC .......... 701/29.1; 701/438; 701/439; 701/411; 701/32.9; 701/533; 701/22; 903/915; 903/930; 903/903; 700/291; 700/296; 700/297; 320/109

(58) Field of Classification Search
USPC  701/29.1, 438, 439, 411, 32.9, 533; 903/903, 903/915, 930; 700/291, 296, 297
See application file for complete search history.

(56) References Cited

U.S. PATENT DOCUMENTS

| 6,959,282 | B2 * | 10/2005 | Kakihara et al. | 705/13 |
| 2003/0189498 | A1 * | 10/2003 | Kakihara et al. | 340/928 |
| 2010/0256830 | A1 * | 10/2010 | Kressner et al. | 700/291 |
| 2011/0224852 | A1 * | 9/2011 | Profitt-Brown et al. | 701/22 |
| 2012/0179323 | A1 * | 7/2012 | Profitt-Brown et al. | 701/29.1 |
| 2012/0303257 | A1 * | 11/2012 | Ichihara | 701/300 |

FOREIGN PATENT DOCUMENTS

| JP | 2003 262525 | 9/2003 |
| JP | 2004 215468 | 7/2004 |
| JP | 2006 331405 | 12/2006 |
| JP | 2007 148590 | 6/2007 |
| JP | 2008 298537 | 12/2008 |
| JP | 2009 148041 | 7/2009 |

OTHER PUBLICATIONS

International Search Report Issued Jun. 21, 2011 in PCT/JP11/56064 Filed Mar. 15, 2011.

* cited by examiner

*Primary Examiner* — Redhwan K Mawari
(74) *Attorney, Agent, or Firm* — Oblon, Spivak, McClelland, Maier & Neustadt, L.L.P.

(57) ABSTRACT

A power charging station administration device administrates available time slot information and installation site information set by an administrator of an in-vehicle battery charger, that is, the available time slot information representing time slots at which the in-vehicle battery charger is available and the installation site information representing the installation site of the in-vehicle battery charger using an administration. An information publication unit publishes the available time slot information and the installation site information administrated by the administration unit on a homepage. An occupant of a vehicle A other than the administrator of the in-vehicle battery charger can use the in-vehicle battery charger by verifying the published information during time slots at which the in-vehicle battery charger is available.

6 Claims, 2 Drawing Sheets

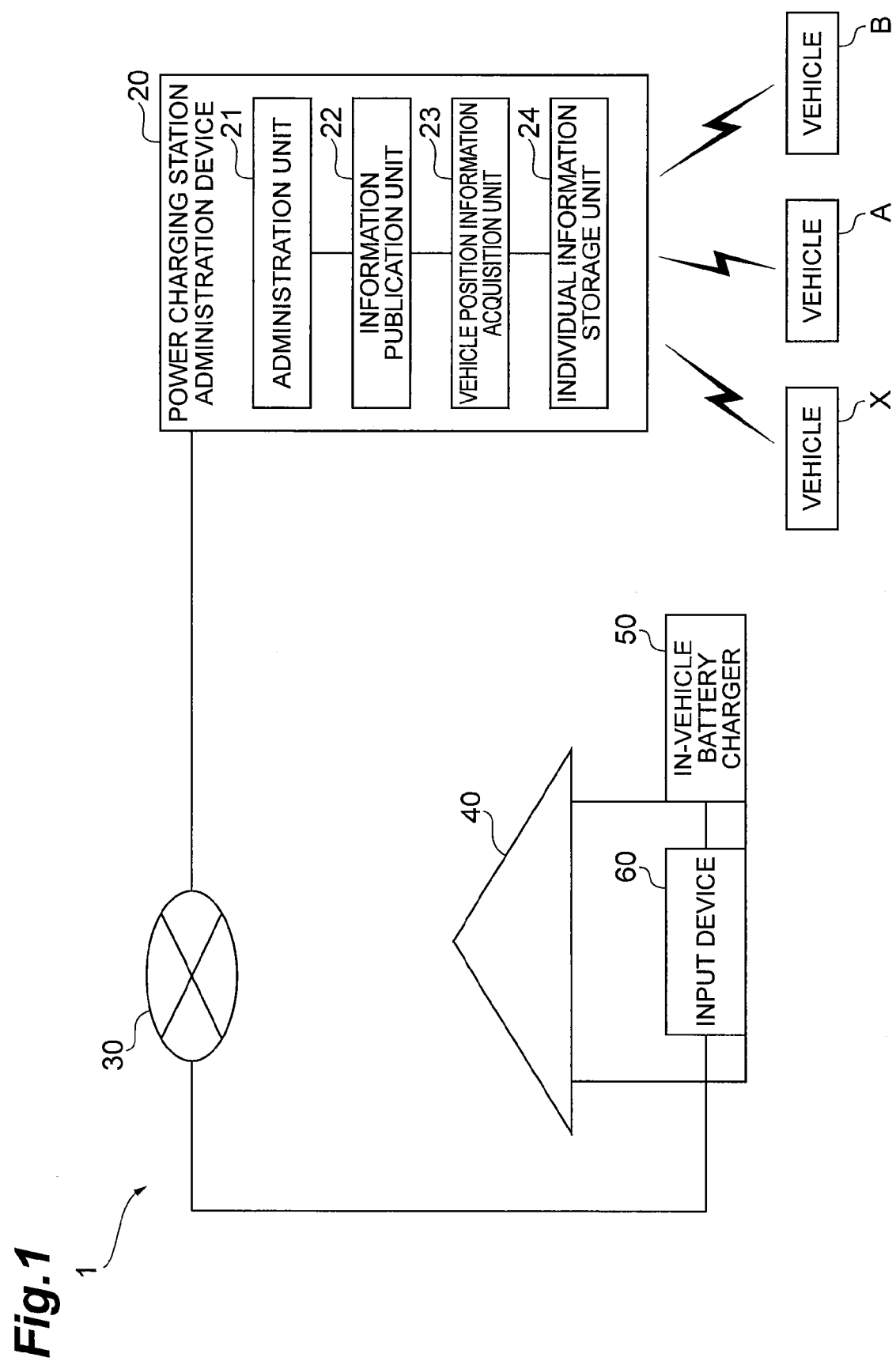

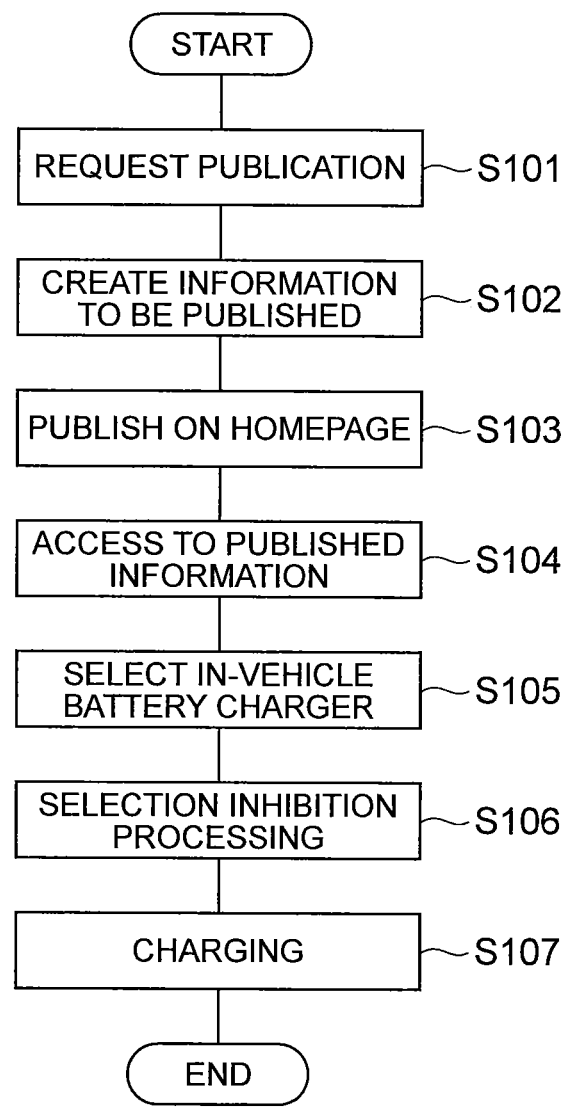

POWER CHARGING STATION ADMINISTRATION DEVICE

TECHNICAL FIELD

The present invention relates to a power charging station administration device which administrates an in-vehicle battery charger for household use in a residence or the like.

BACKGROUND ART

For example, as a technique which supplies power to a battery-mounted vehicle, a technique described in Patent Literature 1 has hitherto been known. According to the technique described in Patent Literature 1, an in-vehicle battery is replaced in a power charging station, and information relating to the type of charged in-vehicle battery or the number of charged in-vehicle batteries in the power charging station is readable in a vehicle.

Citation List

Patent Literature

[Patent Literature 1] Japanese Unexamined Patent Application Publication No. 2004-215468

SUMMARY OF INVENTION

Technical Problem

However, the technique of the related art has been based on the assumption that the in-vehicle battery is replaced in the power charging station, and has not been considered charging of the in-vehicle battery in the power charging station. When charging is performed in the power charging station, the charging time may change considerably depending on the battery level or fast charging/normal charging, and there is a need that information relating to the available time slots of the charger or the like is readable in the vehicle. Meanwhile, in the technique of the related art, there is a problem in that it is impossible to address this need.

Accordingly, the invention has been accomplished in consideration of the above-described problems, and an object of the invention is to provide a power charging station administration device capable of effectively utilizing an in-vehicle battery charger.

Solution to Problem

A power charging station administration device according to the invention includes administration means for administrating available time slot information representing time slots at which an in-vehicle battery charger is available and installation site information representing the installation site of the in-vehicle battery charger, and information publication means for publishing the available time slot information and the installation site information administrated by the administration means on a communication network.

In the invention, the available time slot information representing the time slots at which the in-vehicle battery charger is available and the installation site information representing the installation site of the in-vehicle battery charger are administrated by the administration means. The information publication means publishes the available time slot information and the installation site information administrated by the administration means on the communication network. For this reason, other people than an administrator of an in-vehicle battery charger in an individual residence or the like can use the in-vehicle battery charger during time slots, at which the in-vehicle battery charger is available, by verifying information published by the information publication means. In this way, other people than the administrator of the in-vehicle battery charger can use the in-vehicle battery charger, making it possible to effectively utilize the in-vehicle battery charger.

It is preferable that the available time slot information be input from an input device connected to the in-vehicle battery charger.

In this case, the available time slot information can be easily input using the input device connected to the in-vehicle battery charger.

It is preferable that the power charging station administration device further includes vehicle position information acquisition means for acquiring vehicle position information representing the position of a vehicle of an administrator of the in-vehicle battery charger, and the information publication means changes the available time slots of the in-vehicle battery charger in the available time slot information on the basis of the position of the vehicle of the administrator of the in-vehicle battery charger acquired by the vehicle position information acquisition means and the installation site of the in-vehicle battery charger, and publishes the changed available time slot information and installation site information on the communication network.

In this case, the vehicle position information acquisition means acquires the vehicle position information representing the position of the vehicle of the administrator of the in-vehicle battery charger. The information publication means changes the available time slots of the in-vehicle battery charger in the available time slot information on the basis of the position of the vehicle of the administrator of the in-vehicle battery charger acquired by the vehicle position information acquisition means and the installation site of the in-vehicle battery charger, and publishes the changed available time slot information and installation site information on the communication network. Specifically, for example, as the vehicle of the administrator of the in-vehicle battery charger is closer to the in-vehicle battery charger, the information publication means shortens the available time slots. Therefore, when the vehicle of the administrator returns to the installation site of the in-vehicle battery charger, it is possible to suppress inconvenience due to the use of the in-vehicle battery charger by other people, it becomes easy for the administrator to use the in-vehicle battery charger, and it becomes easy to use a site where the in-vehicle battery charger is installed.

It is preferable that the administration means further administrate exceptional usage information representing whether or not the in-vehicle battery charger is available when a predetermined condition is satisfied during a time slot other than the time slots at which the in-vehicle battery charger is available, and the information publication means publishes the exceptional usage information administrated by the administration means on the communication network in addition to the installation site information and the available time slot information.

In this case, the administration means further administrates the exceptional usage information representing whether or not the in-vehicle battery charger is available when a predetermined condition is satisfied during a time slot other than the time slots at which the in-vehicle battery charger is available. The information publication means publishes the exceptional usage information administrated by the administration means on the communication network in addition to the installation site information and the available time slot information. The predetermined condition for determining whether or not the in-vehicle battery charger is available during a time slot other than the time slots at which the in-vehicle battery charger is available refers to emergency, for example, the vehicle of another person other than the administrator of the in-vehicle battery charger has a low battery level and a short distance-to-empty with respect to the installation site of a commercial in-vehicle battery charger or an in-vehicle battery charger of his/her residence. Therefore, in this case, other people can use the in-vehicle battery charger during a time slot other than the available time slots by verifying the exceptional usage information published by the information publication means.

It is preferable that, when there is an information publication request from a vehicle, the information publication means publishes, on the communication network, the available time slot information and the installation site information on an in-vehicle battery charger within a predetermined range from the vehicle which requests publication. In this case, available time slot information and installation site information on an in-vehicle battery charger around a vehicle which requests publication are published, and the vehicle which requests publication can acquire suitable available time slot information and installation site information.

It is preferable that at least one of the available time slot information and the installation site information be input by an administrator of the in-vehicle battery charger. In this case, desired information can be input by the administrator.

Advantageous Effects of Invention

According to the invention, it is possible to provide a power charging station administration device which can effectively utilize an in-vehicle battery charger.

BRIEF DESCRIPTION OF DRAWINGS

FIG. 1 is a diagram showing the overall configuration of a power charging station administration system according to the invention.

FIG. 2 is a flowchart showing operation and the flow of processing of each unit from when a vehicle requests an in-vehicle battery charger for information publication until charging is performed.

DESCRIPTION OF EMBODIMENTS

Hereinafter, a preferred embodiment of a power charging station administration device according to the invention will be described in detail with reference to the drawings. In the description of the drawings, the same components are represented by the same reference numerals, and overlapping description will be omitted.

First, the overall configuration of a power charging station administration system to which a power charging station administration device of this embodiment is applied will be described. FIG. 1 is a functional block diagram showing the overall configuration of a power charging station administration system 1. As shown in FIG. 1, the power charging station administration system 1 includes a residence 40 where an in-vehicle battery charger 50 and an input device 60 are installed, a power charging station administration device 20 which is communicably connected to the in-vehicle battery charger 50 and the input device 60 through an Internet network 30, and vehicles X, A, and B.

Each of the vehicles X, A, and B has a battery mounted therein, and travels when a motor is driven with power of the battery. An occupant of each of the vehicles X, A, and B can communicate with the power charging station administration device 20 through wireless communication, and can read information (the details will be described below) which is published on a homepage or the like by the power charging station administration device 20. Although in this embodiment, a case where three vehicles (vehicles X, A, and B) are included in the power charging station administration system 1 has been described, the number of vehicles is not limited thereto.

The residence 40 is an individual residence or a housing complex. In this embodiment, it is assumed that the residence 40 is an individual residence, and the owner of the residence 40 and the owner of the vehicle X are the same. Accordingly, the in-vehicle battery charger 50 in the residence 40 is primarily used by the vehicle X. The in-vehicle battery charger 50 connects a charge cable and the vehicles X, A, and B to charge the battery mounted in the vehicle. The in-vehicle battery charger 50 acquires identification information of a vehicle which is connected to the in-vehicle battery charger 50, and transmits the identification information to the power charging station administration device 20 through the Internet network 30. When identifying a vehicle connected to the in-vehicle battery charger 50, for example, a PLC (Power Line Communication) technique may be used.

The input device 60 receives registration information (the details will be described below) which is input by the owner of the residence 40, that is, the administrator of the in-vehicle battery charger 50 in the residence 40. The registration information input through the input device 60 is output to the power charging station administration device 20 through the Internet network 30, and is registered in the power charging station administration device 20.

The registration information which is input to the input device 60 by the administrator of the in-vehicle battery charger 50 will be described. When it is considered that another vehicle (a vehicle other than the vehicle X which is owned by the administrator of the in-vehicle battery charger 50. In this embodiment, the vehicles A and B are used.) of the in-vehicle battery charger 50 may be used, the administrator of the in-vehicle battery charger 50 inputs the registration information through the input device 60, and registers the registration information in the power charging station administration device 20.

The registration information which is input by the administrator of the in-vehicle battery charger 50 includes available time slot information representing time slots at which another vehicle can use the in-vehicle battery charger 50, installation site information representing the installation site of the in-vehicle battery charger 50, and exceptional usage information representing whether or not the in-vehicle battery charger 50 is available when a predetermined condition is satisfied during a time slot other than the time slots at which the in-vehicle battery charger 50 is available. The predetermined condition for determining whether or not the in-vehicle battery charger 50 is available during a time slot other than the time slots at which the in-vehicle battery charger 50 is available refers to emergency, for example, when a vehicle of another person other than the administrator of the in-vehicle battery charger 50 has a low battery level and a short distance-to-empty with respect to the installation site of a commercial in-vehicle battery charger or an in-vehicle battery charger of his/her residence. The exceptional usage information takes into consideration the intention of the administrator who thinks that, even if the administrator of the in-vehicle battery charger uses the in-vehicle battery charger, when another person is in emergency, the in-vehicle battery charger may be yielded to another person. It is assumed that the available time slot information includes the concept of whether or not there is a case where the in-vehicle battery charger 50 is occupied because another vehicle uses the in-vehicle battery charger 50 (what time the in-vehicle battery charger 50 is not occupied), by what time the in-vehicle battery charger 50 can be used because another vehicle is reserved to use the in-vehicle battery charger 50, and the like, in addition to time slots at which another vehicle can use the in-vehicle battery charger 50.

The registration information includes the telephone number of the residence 40 where the in-vehicle battery charger 50 is installed, information relating to the fee or rate which is paid to the administrator of the in-vehicle battery charger 50 when charging is performed, information relating to the direction of the in-vehicle battery charger 50 (from which direction of the vehicle (the right side, the left side, or the like of the vehicle) power can be supplied), information relating to a parking space or the number of parkable vehicles when power is supplied using the in-vehicle battery charger 50, and information (in this embodiment, information of the vehicle X) relating to a vehicle or the number of vehicles which primarily use the in-vehicle battery charger 50. It is assumed that the fee or rate which is paid to the administrator of the in-vehicle battery charger 50 when another person uses the in-vehicle battery charger 50 may be freely changed by the administrator of the in-vehicle battery charger 50 depending on, for example, day of the week, season, and demand.

The power charging station administration device 20 includes an administration unit 21, an information publication unit 22, a vehicle position information acquisition unit 23, and an individual information storage unit 24.

The administration unit 21 functions as administration means for administrating registration information including available time slot information, installation site information, exceptional usage information, and the like set by the administrator of the in-vehicle battery charger 50 using the input device 60. Of the registration information administrated by the administration unit 21, the available time slot information can be changed when the administrator of the in-vehicle battery charger having registered the registration information performs communication with the power charging station administration device 20 using, for example, a mobile phone or a communication device in the vehicle. In this embodiment, it is assumed that the registration information on the in-vehicle battery charger 50 which is administrated by the owner of the vehicle X is registered.

An owner of a vehicle who wants to use an in-vehicle battery charger which is administrated by another person registers individual information (payment information, ID, password, or the like) in the power charging station administration device 20 in advance. The individual information storage unit 24 stores the registered individual information. When an in-vehicle battery charger which is administrated by another person is used (for example, the vehicle A uses the in-vehicle battery charger 50 which is administrated by the owner of the vehicle X), the individual information stored in the individual information storage unit 24 is used when paying the fee to the administrator of the in-vehicle battery charger. In this embodiment, it is assumed that the owners of the vehicles X, A, and B register individual information in the individual information storage unit 24.

The vehicle position information acquisition unit 23 functions as vehicle position information acquisition means for acquiring the current position of a vehicle which primarily uses an in-vehicle battery charger whose registration information is registered in the administration unit 21. For example, when the registration information on the in-vehicle battery charger 50 is registered in the administration unit 21, the vehicle position information acquisition unit 23 acquires the current position of the vehicle X which is owned by the administrator of the in-vehicle battery charger 50. The vehicle position information acquisition unit 23 acquires the current position of a vehicle whose individual information is registered in the individual information storage unit 24. Each of the vehicles X, A, and B can transmit current position information of the host vehicle to the vehicle position information acquisition unit 23 of the power charging station administration device 20.

The information publication unit 22 functions as information publication means for publishing the available time slot information, the installation site information, the exceptional usage information, and the like administrated by the administration unit 21 on a communication network. For this reason, if there is a request to publish information, such as the installation site of the in-vehicle battery charger, from a vehicle whose individual information is stored in the individual information storage unit 24, the information publication unit 22 searches for an in-vehicle battery charger around the vehicle, which requests publication, on the basis of the current position information of the vehicle which requests publication, acquired by the vehicle position information acquisition unit 23 and the installation site information of the in-vehicle battery charger which is administrated by the administration unit 21. The information publication unit 22 publishes information relating to the searched in-vehicle battery charger on the communication network such that the vehicle which requests publication can read the information. In this embodiment, it is assumed that the information publication unit 22 publishes the information relating to the in-vehicle battery charger on a homepage.

Specifically, the information publication unit 22 publishes, as the information relating to the searched in-vehicle battery charger, the available time slot information, the installation site information, the exceptional usage information, information relating to the fee when the in-vehicle battery charger is used, the distance from the vehicle which requests publication to the in-vehicle battery charger, and the like.

The available time slot information, the installation site information, the exceptional usage information, and the information relating to the fee when the in-vehicle battery charger is used are extracted from the registration information which is administrated in the administration unit 21. The information relating to the distance from the vehicle which requests publication to the in-vehicle battery charger is calculated on the basis of the registration information administrated by the administration unit 21 and position information of the vehicle acquired by the vehicle position information acquisition unit 23 (position information of the vehicle which requests publication).

In the case of publishing the available time slot information of the in-vehicle battery charger, when the position of the vehicle of the administrator is close to the installation site of the in-vehicle battery charger, the information publication unit 22 corrects the available time slots in the available time slot information to be shortened on the basis of the position information of the vehicle of the administrator of the in-vehicle battery charger acquired by the vehicle position information acquisition unit 23. Specifically, there is a case where the vehicle of the administrator returns to the residence 40 faster than the time (the time which is registered in advance as an available time slot through the input device 60) postulated by the administrator of the in-vehicle battery charger 50. In this case, the available time slots are shortened, thereby suppressing the use of the in-vehicle battery charger 50 by other vehicles when the vehicle X of the administrator of the in-vehicle battery charger 50 returns to the residence 40.

When there are a plurality of in-vehicle battery chargers around the vehicle which requests publication, the information publication unit 22 sorts and publishes information relating to the in-vehicle battery chargers on the homepage in order of fee when the battery is charged to a given level (for example, in ascending order of fee) taking into consideration the distance from the position of the vehicle which requests publication to the in-vehicle battery charger. The given level may be the level at which the battery is fully charged, or the level of predicted power consumption necessary until the vehicle which requests publication reaches his/her residence or a destination. Instead of sorting the information of the in-vehicle battery chargers in order of fee, the information of the in-vehicle battery chargers may be sorted in order of charging time to a given level (for example, in ascending order of charging time).

In the case of publishing the information relating to the in-vehicle battery chargers on the homepage, the information publication unit 22 can select an in-vehicle battery charger which will be used by the occupant of the vehicle which requests publication. If an in-vehicle battery charger is selected by the occupant of the vehicle which requests publication, it is considered that the selected in-vehicle battery charger is reserved to be used by the vehicle which requests publication, and the information of the in-vehicle battery charger is deleted from the homepage, such that the in-vehicle battery charger is not selected by the occupant of another vehicle. When a vehicle (including the vehicle of the administrator of the in-vehicle battery charger) other than the reserved vehicle is connected to the in-vehicle battery charger 50, the power charging station administration device 20 controls the in-vehicle battery charger 50 to stop power supply or to be unable to connect on the basis of the individual information, such as the ID, stored in the individual information storage unit 24.

Next, the operation and the flow of processing of each unit from when a vehicle requests the power charging station administration device 20 for publication of information relating to an in-vehicle battery charger until charging is performed will be described. It is assumed that the vehicle A requests the power charging station administration device 20 for publication, and charging is performed using the in-vehicle battery charger 50 which is administrated by the owner of the vehicle X.

As shown in FIG. 2, when the battery level of the vehicle A is reduced, in order to inquire whether or not there is an available in-vehicle battery charger, the occupant of the vehicle A requests the power charging station administration device 20 for publication of information relating to the available in-vehicle battery charger (Step S101).

If there is a publication request, the information publication unit 22 of the power charging station administration device 20 searches for in-vehicle battery chargers around the vehicle A on the basis of the registration information administrated by the administration unit 21. As described above, in regard to each of the searched in-vehicle battery chargers, the information publication unit 22 creates the available time slot information, the installation site information, the exceptional usage information, and the information relating to the fee when the in-vehicle battery charger is used and the distance from the vehicle which requests publication to the in-vehicle battery charger (Step S102). The information publication unit 22 publishes the created information on the homepage (Step S103). It is assumed that information relating to a plurality of in-vehicle battery chargers including the in-vehicle battery charger 50 is published.

The occupant of the vehicle A accesses the information published on the homepage (Step S104), and selects an in-vehicle battery charger for charging from among the in-vehicle battery chargers at the available time slots on the basis of the published available time slot information (in this case, it is assumed that the in-vehicle battery charger 50 is selected) (Step S105). If the in-vehicle battery charger 50 is selected by the vehicle A, the information publication unit 22 of the power charging station administration device 20 deletes the information relating to the in-vehicle battery charger 50 from the homepage, such that another person is unable to select the in-vehicle battery charger 50 (Step S106). Thereafter, the driver of the vehicle A moves the vehicle A to the installation site of the in-vehicle battery charger 50 on the basis of the position information of the in-vehicle battery charger 50 published on the homepage, and performs charging through the in-vehicle battery charger 50 (Step S107). In the case of charging the vehicle A, the in-vehicle battery charger 50 transmits the identification information of the vehicle A to the power charging station administration device 20. For this reason, the power charging station administration device 20 can process the bill for the fee for use of the in-vehicle battery charger 50 using the received identification information.

In Step S105, in the case that no in-vehicle battery chargers at the available time slots are found, when the exceptional usage information can be used, the occupant of the vehicle A can select an in-vehicle battery charger whose exceptional usage information can be used, and can use the in-vehicle battery charger.

Subsequently, the action and effects of the power charging station administration system 1 of this embodiment will be described. According to the power charging station administration system 1 of this embodiment, the power charging station administration device 20 administrates the available time slot information and the installation site information set by the administrator of the in-vehicle battery charger 50, that is, the available time slot information representing the available time slots at which the in-vehicle battery charger 50 is available and the installation site information representing the installation site of the in-vehicle battery charger 50 using the administration unit 21. The information publication unit 22 publishes the available time slot information and the installation site information administrated by the administration unit 21 on the homepage. For this reason, for example, another person (the occupant of each of the vehicles A and B) other than the administrator (the owner of the vehicle X) of the in-vehicle battery charger 50 in the individual residence 40 verifies the information published on the homepage by the information publication unit 22, and can use the in-vehicle battery charger 50 during time slots at which the in-vehicle battery charger 50 is available. In this way, another person other than the administrator of the in-vehicle battery charger 50 can also use the in-vehicle battery charger 50, making it possible to effectively utilize the in-vehicle battery charger 50.

With the use of the input device 60 in the in-vehicle battery charger 50, it is possible to easily input the exceptional usage information and the like.

The vehicle position information acquisition unit 23 of the power charging station administration device 20 acquires the vehicle position information representing the position of the vehicle of the administrator of the in-vehicle battery charger. The information publication unit 22 changes the available time slots of the in-vehicle battery charger in the available time slot information on the basis of the position of the vehicle X of the administrator of the in-vehicle battery charger 50 acquired by the vehicle position information acquisition unit 23 and the installation site of the in-vehicle battery charger 50, and publishes the changed available time slot information and installation site information on the homepage. Specifically, for example, as the vehicle X of the administrator (the owner of the vehicle X) of the in-vehicle battery charger 50 is closer to the in-vehicle battery charger 50, the information publication unit 22 shortens the available time slots. Accordingly, it is possible to suppress inconvenience due to the use of the in-vehicle battery charger 50 by other people (vehicles A and B) when the vehicle X of the administrator returns to the installation site of the in-vehicle battery charger 50, it becomes easy for the administrator to use the in-vehicle battery charger 50, and it becomes easy to use the site where the in-vehicle battery charger 50 is installed.

The administration unit 21 further administrates the exceptional usage information representing whether or not the in-vehicle battery charger 50 is available when a predetermined condition is satisfied during a time slot other than the available time slots of the in-vehicle battery charger 50 set by the administrator of the in-vehicle battery charger. The information publication unit 22 publishes the exceptional usage information administrated by the administration unit 21 on the homepage in addition to the installation site information and the available time slot information. Accordingly, for example, when the vehicle A of another person other than the administrator of the in-vehicle battery charger 50 has a low battery level and a short distance-to-empty with respect to the installation site of a commercial in-vehicle battery charger or an in-vehicle battery charger of his/her residence, specifically, in the case of emergency, the vehicle A can use the in-vehicle battery charger 50 during a time slot other than the available time slots of the in-vehicle battery charger 50 by verifying the exceptional usage information published by the information publication unit 22.

The fee for use of the in-vehicle battery charger 50 can be billed for, and in this case, the administrator of the in-vehicle battery charger 50 can reap a benefit. When the in-vehicle battery charger 50 is exceptionally used on the basis of the exceptional usage information, the fee for charging can become higher than usual.

The available time slot information, the installation site information, and the like relating to an in-vehicle battery charger around a vehicle which requests publication are published, such that the vehicle which requests publication can easily acquire information from the current position, specifically, can acquire available time slot information, installation site information, and the like relating to a suitable in-vehicle battery charger.

The available time slot information or the installation site information can be input by the administrator of the in-vehicle battery charger, thereby inputting desired information of the administrator.

The invention is not limited to the foregoing embodiment. For example, when the vehicles A and B other than the administrator of the in-vehicle battery charger 50 perform charging using the in-vehicle battery charger 50, the vehicles A and B may be photographed by a camera (not shown), and the photographed video may be transmitted to the administrator of the in-vehicle battery charger 50 or may be recorded in the power charging station administration device 20. In this case, for example, when the vehicles A and B come into contact with the in-vehicle battery charger 50 or when failure occurs in the in-vehicle battery charger 50, it is possible to specify a vehicle which uses the in-vehicle battery charger 50 at the time of contact or failure. It is also possible to publish information relating to whether or not photographing by the camera is done when the in-vehicle battery charger 50 is used on the homepage.

Industrial Applicability

It is possible to provide a power charging station administration device which can effectively utilize an in-vehicle battery charger.

Reference Signs List

1: power charging station administration system, 20: power charging station administration device, 21: administration unit, 22: information publication unit, 23: vehicle position information acquisition unit, 50: in-vehicle battery charger, X, A, B: vehicle.

The invention claimed is:

1. A power charging station administration device comprising:
    vehicle position information acquisition means for acquiring vehicle position information representing the position of a vehicle;
    administration means for administrating registration information including installation site information representing the installation site of an in-vehicle battery charger which is able to charge an in-vehicle battery of the vehicle and information relating to whether or not a vehicle other than a vehicle registered in the in-vehicle battery charger is permitted to use the in-vehicle battery charger; and
    information publication means for, when there is a request for publication of the registration information from the vehicle, on the basis of the vehicle position information acquired by the vehicle position information acquisition means and the registration information administrated by the administration means, publishing the registration information in the in-vehicle battery charger which is within a predetermine range from the vehicle which requests for the registration information and is permitted for a vehicle other than the vehicle which is registered in the in-vehicle battery charger to use, to the vehicle which requests for the registration information,
    wherein the registration information further includes available time slot information representing time slots at which the in-vehicle battery charger is available,
    the vehicle position information acquisition means acquires the vehicle position information representing the position of the vehicle which is registered in the in-vehicle battery charger, and
    the information publication means changes the available time slots of the in-vehicle battery charger in the available time slot information on the basis of the position of the vehicle registered in the in-vehicle battery charger acquired by the vehicle position information acquisition means and the installation site of the in-vehicle battery charger, and publishes the changed available time slot information and installation site information to the vehicle which requests for the registration information.

2. The power charging station administration device according to claim 1,
    wherein the available time slot information is input from an input device connected to the in-vehicle battery charger.

3. The power charging station administration device according to claim 1,
    wherein the information publication means changes the available time slot information such that the available time slots of the in-vehicle battery charger in the available time slot information are shortened when the distance between the position of the vehicle registered in the in-vehicle battery charger acquired by the vehicle position information acquisition means and the installation site of the in-vehicle battery charger is shorter than a predetermined distance, and publishes the changed available time slot information to the vehicle which requests for the registration information.

4. The power charging station administration device according to claim 1,
wherein the administration means further administrates exceptional usage information representing whether or not the in-vehicle battery charger is available when a predetermined condition is satisfied during a time slot other than the available time slots of the in-vehicle battery charger, and
the information publication means publishes the exceptional usage information administrated by the administration means to the vehicle which requests for the registration information, in addition to the registration information.

5. The power charging station administration device according to claim 1,
wherein at least one of the available time slot information and the installation site information is input by the administrator of the in-vehicle battery charger.

6. A power charging station administration device comprising:
vehicle position information acquisition unit that acquires vehicle position information representing the position of a vehicle;
administration unit that administrates registration information including installation site information representing the installation site of an in-vehicle battery charger which is able to charge an in-vehicle battery of the vehicle and information relating to whether or not a vehicle other than a vehicle registered in the in-vehicle battery charger is permitted to use the in-vehicle battery charger; and
information publication unit that, when there is a request for publication of the registration information from the vehicle, on the basis of the vehicle position information acquired by the vehicle position information acquisition unit and the registration information administrated by the administration unit, publishes the registration information in the in-vehicle battery charger which is within a predetermine range from the vehicle which requests for the registration information and is permitted for a vehicle other than the vehicle which is registered in the in-vehicle battery charger to use, to the vehicle which requests for the registration information,
wherein the registration information further includes available time slot information representing time slots at which the in-vehicle battery charger is available,
the vehicle position information acquisition unit acquires the vehicle position information representing the position of the vehicle which is registered in the in-vehicle battery charger, and
the information publication unit changes the available time slots of the in-vehicle battery charger in the available time slot information on the basis of the position of the vehicle registered in the in-vehicle battery charger acquired by the vehicle position information acquisition unit and the installation site of the in-vehicle battery charger, and publishes the changed available time slot information and installation site information to the vehicle which requests for the registration information.

* * * * *